R. S. BERGER.
GREASE CUP.
APPLICATION FILED DEC. 17, 1913.
1,095,546.
Patented May 5, 1914.
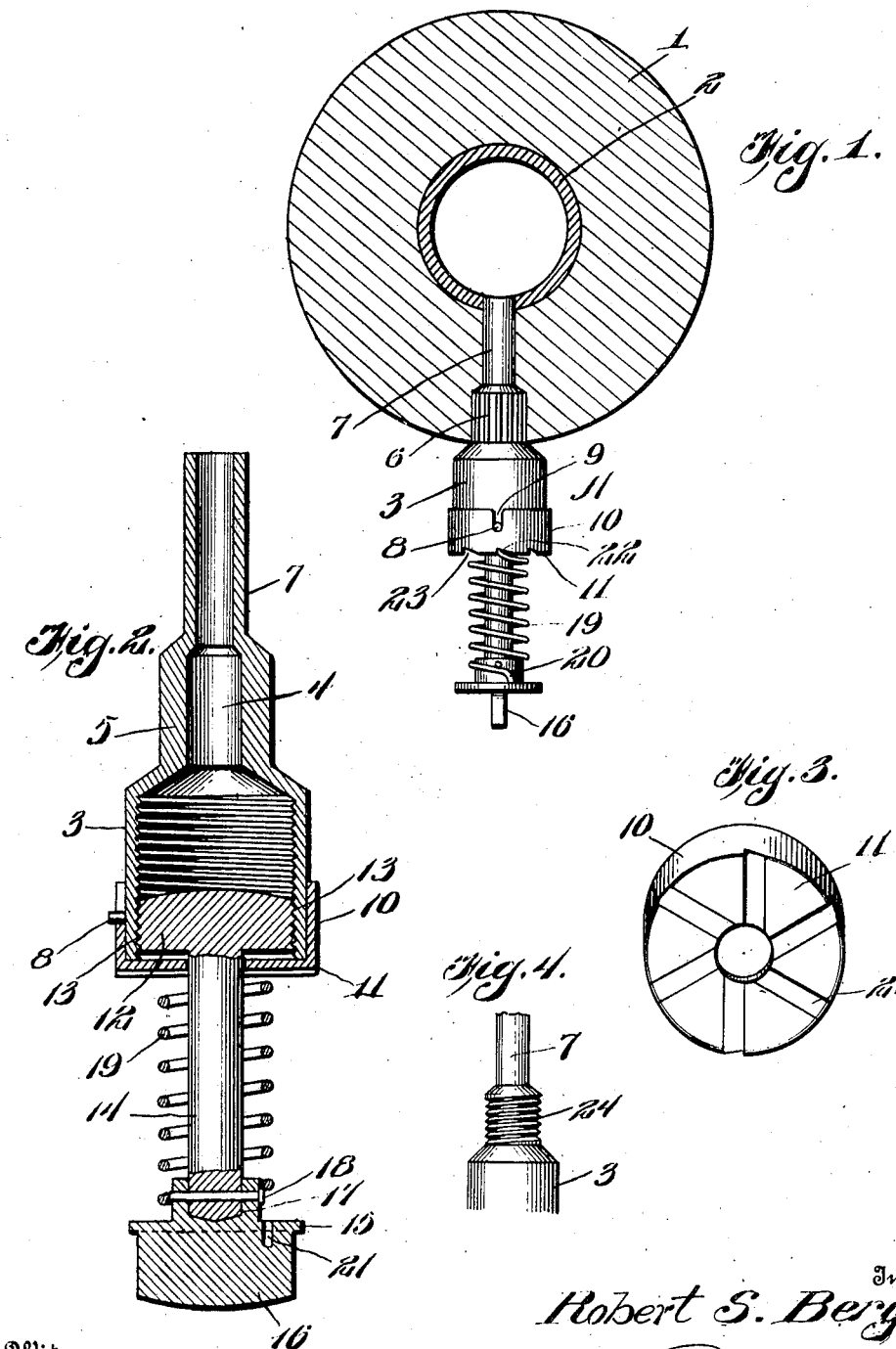
Witnesses
J. R. Heinrichs
C. C. Hines
Inventor
Robert S. Berger
By Rex Ful M. Smith
Attorney

UNITED STATES PATENT OFFICE.

ROBERT S. BERGER, OF WANAKENA, NEW YORK.

GREASE-CUP.

1,095,546.  Specification of Letters Patent.  Patented May 5, 1914.

Application filed December 17, 1913. Serial No. 807,326.

*To all whom it may concern:*

Be it known that I, ROBERT S. BERGER, a citizen of the United States of America, residing at Wanakena, in the county of St. Lawrence and State of New York, have invented a certain new and useful Grease-Cup, of which the following is a specification, reference being had therein to the accompanying drawing.

This invention relates to grease cups, the object of the invention being to produce a grease cup which is especially adapted for use on the hubs of vehicle wheels, the grease cup embodying means whereby the grease or other lubricant is expressed from the body of the cup and discharged upon the spindle on which the wheel revolves, the said grease cup embodying novel means whereby the expressing plunger is locked against return movement, and the cap which closes the receiving end of the grease cup is held in interlocked engagement with the body of the cup.

With the above and other objects in view, the invention consists in the novel construction, combination and arrangement of parts, as will hereinafter be more fully described, illustrated and claimed.

In the accompanying drawings:—Figure 1 is a transverse section through the hub of a vehicle wheel, showing the grease cup of this invention applied thereto and shown in side elevation. Fig. 2 is a diametrical section through the grease cup on an enlarged scale. Fig. 3 is a detail perspective view of the cap. Fig. 4 is a fragmentary elevation of the grease cup, showing the same threaded to screw into a wheel hub.

In Fig. 1, 1 designates the hub of a vehicle wheel in which is contained the usual metal axle skein 2.

The grease cup of this invention which is generally designated A, comprises a hollow cylindrical body 3 forming the cup proper, the same being of any suitable size to receive the desired quantity of grease or other lubricant. This cup is left open at one end to provide for introducing the grease therein and opposite the filling opening the cup is formed with a discharge opening 4. The discharge end of the cup is reduced as shown at 5 and is provided on the outside thereof with longitudinally extending keys or ribs 6 formed integrally therewith and adapted, when the cup as a whole is driven into a wooden hub as illustrated in Fig. 1, to prevent the grease cup from turning relatively to said hub. Beyond the portion 5 the cup is again reduced as shown at 7 to form a tubular conduit extending to the interior of the skein 2 and it may be noted at this point that the tubular conduit 7 is primarily made of sufficient length to extend through any sized hub and before being applied to the hub, the conduit 7 is cut to the proper length to terminate flush with the inside face of the skein or bushing 2 as indicated in Fig. 1. The hollow cylindrical body or cup 3 is further provided with a pin 8 extending laterally from the side thereof to engage a slot 9 in the flange 10 of a cap 11 which fits over the filling end of the cup 3 as shown in Figs. 1 and 2 and is held in place thereon by means hereinafter described, the pin 8 serving to prevent the cap 11 from rotating relatively to the cup 3.

12 designates an expressing plunger which is threaded into the cup 3 as indicated at 13 so that by turning said plunger, it may be advanced and retracted lengthwise of the cup 3. The plunger 12 is provided with an outwardly extending stem 14 which passes loosely through a central opening in the cap 11 and is provided at its outer extremity with a head 15 preferably formed with an extension 16 constituting a thumb-piece. If the plunger 12 is formed integrally with the stem 14, the head 15 is made separate therefrom and formed with a socket 17 to receive the adjacent end of the stem upon which it is fastened by means of a suitable fastener 18 such as a pin. A coiled expansion spring 19 encircles the stem 14 and has one extremity thereof bent as shown at 20 and inserted in a hole or socket 21 in the head 15. The other extremity of the spring 19 is bent as shown at 22 to form a spring detent which is adapted to engage in one of a series of V-shaped notches 23 formed in the outer face of the cap 11, the said extremity of the spring being adapted to snap over the V-shaped notches 23 as the head 15 is turned and prevent the stem 14 and plunger 12 from turning backward.

From the foregoing description it will be understood that the spring 19 serves to hold the cap 11 in place on the cup 3; it also maintains the engagement between the slotted flange 10 of the cap, and the pin or key 8 on the cup thereby preventing the cap from turning on the cup; it also serves as a detent to prevent the plunger 12 from turning within the cup 3 and thus holds said plunger at any point in its inward movement where it may be left after forcing a portion of the lubricant to the spindle or journal.

To detach the cap 11 and the plunger 12, the spring 19 is compressed in the direction of the head 15 so as to disengage said spring from the notches or teeth 23. This permits the cap 11 to be moved out of engagement with the locking pin 8 and also permits the plunger 12 to be turned backwardly until it passes out of threaded engagement with the cup 3.

If it is desired to use the grease cup as a whole in connection with metal hubs or axle boxes, instead of the longitudinally extending keys or ribs 6, screw-threads 24 may be provided on the outside of the portion 5 of the cup between the portions 3 and 7, as shown in Fig. 4, so that it may be screwed into an internally threaded socket in the hub or box instead of driving the same into place which is permitted by the use of the longitudinal ribs 6.

What I claim is:—

A grease cup comprising a hollow cylindrical body having a filling opening at one end and a discharge opening at the opposite end, a pin projecting from the side of said body, a cap closing the filling opening of said body and provided with a flange encircling said body and provided with a slot to receive said pin, said cap being further provided on its outer face with ratchet teeth, an expressing plunger threaded in said body, a stem extending from said plunger outwardly loosely through and beyond said cap, a head on the outer extremity of said stem, and an expansion spring coiled around said stem externally of said body, one extremity of said spring being attached to said head and the other extremity of said spring being adapted to hold the cap on said body and also to engage the ratchet teeth on the cap and lock said plunger.

In testimony whereof I affix my signature in presence of two witnesses.

ROBERT S. BERGER.

Witnesses:
 FRED WESTCOTT,
 L. D. THOMPSON.